United States Patent [19]
Fukushima

[11] Patent Number: 6,145,820
[45] Date of Patent: *Nov. 14, 2000

[54] FLUID FILLED DAMPENING MECHANISM UTILIZING A FLUID HAVING A THICK VISCOSITY

[75] Inventor: Hirotaka Fukushima, Neyagawa, Japan

[73] Assignee: Exedy Corporation, Osaka, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 09/045,822

[22] Filed: Mar. 23, 1998

Related U.S. Application Data

[63] Continuation of application No. 08/948,104, Oct. 9, 1997, abandoned.

[30] Foreign Application Priority Data

Mar. 28, 1997 [JP] Japan ..................................... 9-077923
Mar. 28, 1997 [JP] Japan ..................................... 9-077924

[51] Int. Cl.$^7$ ..................................................... F16D 13/02
[52] U.S. Cl. ........................... 267/136; 192/207; 267/165
[58] Field of Search ..................................... 267/136, 165; 192/207

[56] References Cited

U.S. PATENT DOCUMENTS

| 1,582,562 | 4/1926 | Vogel ..................................... 267/165 |
| 2,145,166 | 1/1939 | Douglas .................................. 267/165 |
| 2,775,105 | 12/1956 | Banker .................................... 267/136 |
| 3,737,155 | 6/1973 | Karlan .................................... 267/136 |
| 5,385,221 | 1/1995 | Van Maanen ........................... 192/207 |

FOREIGN PATENT DOCUMENTS 2196093 4/1988 United Kingdom ................... 267/165

*Primary Examiner*—Matthew C. Graham
*Attorney, Agent, or Firm*—Shinjyu Global IP Counselors, LLP

[57] ABSTRACT

The present invention relates to a clutch disk assembly having a dampening mechanism which includes a hub and a pair of plates joined together at a radial outer portion thereof. The hub and the plates define a generally annular fluid chamber therebetween. An undulated flat-spring is disposed in the annular fluid chamber. The undulated flat-spring is compressible between the hub and a portion of one of the pair of plates in response to relative rotary displacement between the hub and the pair of plates. A viscous fluid is disposed in the annular fluid chamber and has a kinematic viscosity within a range of 500–50,000 cSt at 60° C. A gap is defined between radially extending inner sides of the annular fluid chamber and corresponding sides of the undulated flat-spring. The gap is within a range of 0.1 to 0.6 mm.

5 Claims, 4 Drawing Sheets

FLUID FILLED DAMPENING MECHANISM UTILIZING A FLUID HAVING A THICK VISCOSITY

This application is a continuation in part of U.S. patent application No. 08/948,104, filed Oct. 9, 1997, now abandoned.

BACKGROUND OF THE INVENTION

A. Field of the Invention

The invention relates to a dampening mechanism, particularly to a dampening mechanism utilizing viscous resistance.

B. Description of the Related Art

In a clutch disk assembly, generally, input portions (clutch plate, etc.) to which torque from the engine side is inputted and output portions (spline hub, etc.) which output torque to an output shaft are connected elastically in a circular direction by a torsion spring. The torsion spring is generally formed by a coil spring and can absorb torque fluctuations through expansion and contraction.

In order to absorb low load torque fluctuations, the twisting rigidity of a coil spring needs to be low. Generally, in order to have a low twisting rigidity for a coil spring, the wire diameter of the coil needs to be small. However, a coil with a small wire diameter reduces the capacity for torque transmission. Therefore, by making the diameter of a coil spring large, low rigidity is obtained without reducing torque transmission capacity. As a result, the volume occupied by the coil spring must be relatively large. The large size of the coil spring is an obstacle when it is necessary to reduce the dimensions of the clutch disc assembly.

To solve the problems described above, a dampening mechanism has been developed which includes elongated plate springs which have been bent into a wave or undulated shape. The elongated undulated spring extends in a circular direction within a fluid chamber of the dampening mechanism of the clutch disk assembly.

In the dampening mechanism, a plurality of fluid filled spaces are formed between plate springs, outer circumferential walls and side walls of the fluid chamber. When twisting vibrations are inputted in the dampening mechanism, the plate springs are compressed in a circular direction. At the same time, a plurality of fluid filled spaces contract and the fluid in the spaces flows outside. The fluid flows through a gap between the axially ending part of the plate springs and the side wall of the fluid chamber and generates a predetermined viscous resistance.

However, the above-mentioned viscous resistance generating mechanism does not always generate enough viscous resistance for excessive torque fluctuations during engagement or disengagement of the clutch.

SUMMARY OF THE INVENTION

An object of the present invention is to increase the attenuating effect of excessive torque fluctuations.

In accordance with one aspect of the present invention, a dampening mechanism includes a pair of plates joined together at a radial outer portion thereof and a hub disposed at a generally central portion of the pair of plate, the hub and the plates defining a generally annular fluid chamber therebetween, a portion of the hub extending partially into the annular fluid chamber. An undulated flat-spring is disposed in the annular fluid chamber. The undulated flat-spring is compressible between the portion of the hub and a portion of one of the pair of plates in response to relative rotary displacement between the hub and the pair of plates. A gap is defined between radially extending inner sides of the annular fluid chamber and corresponding sides of the undulated flat-spring, the gap being within a range of 0.1 to 0.6 mm.

Additionally, a viscous fluid is disposed in the annular fluid chamber, the viscous fluid having a kinematic viscosity within a range of 500–50,000 cst at 60° C.

When the pair of plates rotate, torque is transmitted to the hub via the undulated flat-spring. When the twisting vibration is inputted, the plates rotate relative to the hub causing the undulated flat-springs to be compressed. When the twisting angle becomes large, a plurality of fluid filled spaces contract and the fluid in the spaces flows out. At that time, since the gap between the portions of the undulated flat-spring and the inner wall of the side surface of the fluid chamber is 0.6 mm or less, a large viscous resistance is generated. Therefore, excessive torque fluctuations can be attenuated sufficiently. Further, since the kinematic viscosity of the viscous fluid is within a range of 500 50,000 cSt at 60° C. a large amount of viscous resistance is generated. Therefore, excessive torque fluctuations can be attenuated sufficiently.

These and other objects, features, aspects and advantages of the present invention will become more fully apparent from the following detailed description of the present invention when taken in conjunction with the accompanying drawings where like reference numerals denote corresponding parts throughout.

DETAILED DESCRIPTION OF THE PREFERRED EMBODIMENT

Figure 1:
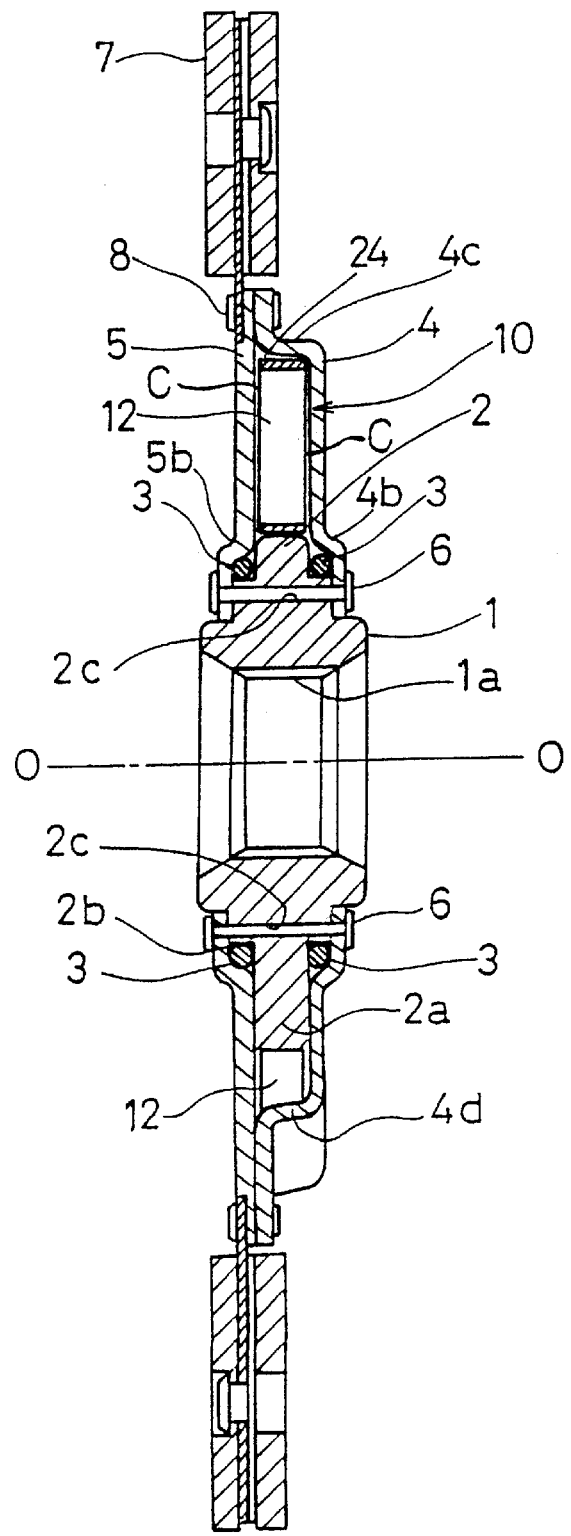
FIG. 1 is a longitudinal sectional view showing a clutch disk in accordance with one embodiment of the present invention.
Figure 2:
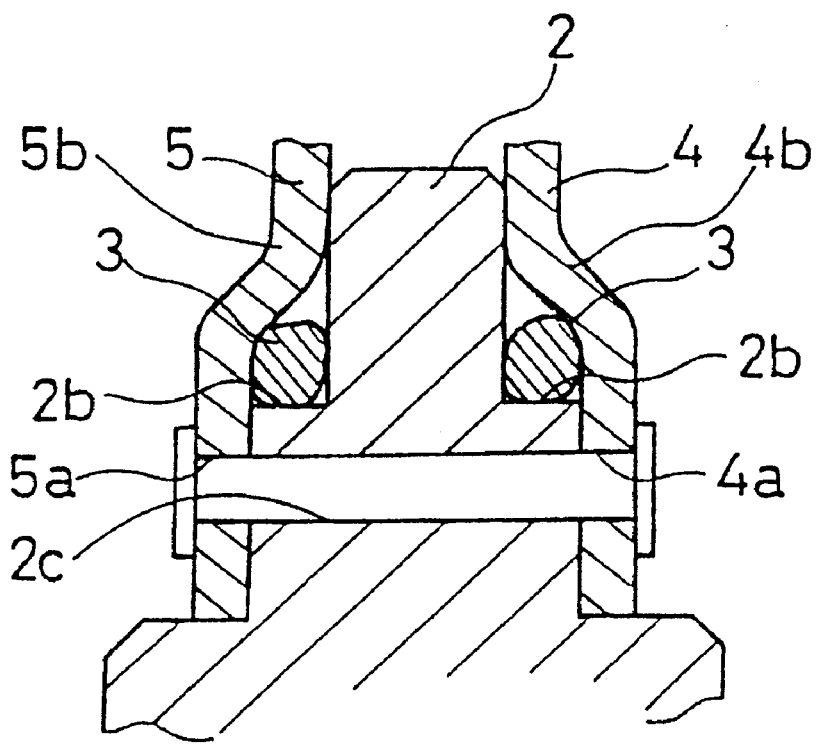
FIG. 2 is an enlarged view of a portion of the clutch disk depicted in FIG. 1.
Figure 3:
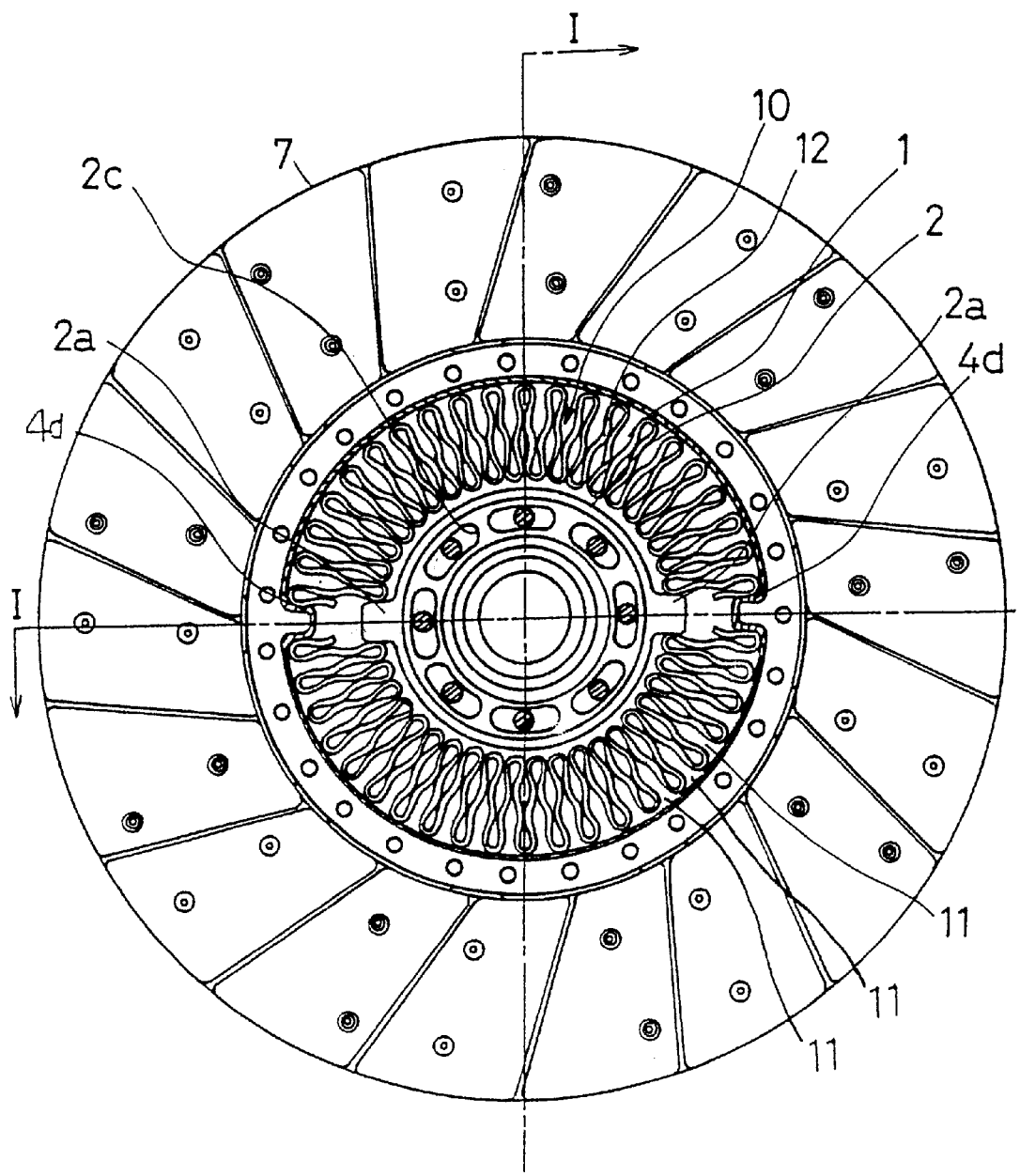
FIG. 3 is a partial cross-sectional view of the clutch disk depicted in FIG. 1, taken along the lines III—III in FIG. 1.

FIGS. 1, 2 and 3 show a clutch disk assembly in accordance with one embodiment of the present invention. In the drawings, the line O—O represent a center line about which the clutch disk assembly rotates.

A spline hub 1 (a second rotatable portion) which is connected to an output shaft (not shown) and is disposed in the center of the clutch disk assembly. The spline hub 1 has a spline hole 1a in a central part that engages an outer circumferential spline part of the output shaft (not shown). In the spline hub 1, a flange part 2 extends radially outwardly.

Two protrusions 2a are formed at radially opposite positions on the outer circumference of the flange part 2, as shown in FIG. 3. On both side faces of the flange part 2, a step 2b is formed in a circular direction, and O-rings 3 are disposed adjacent to the each step 2b. In the inner circumferential side of each step 2b, a plurality of circumferentially spaced apart long holes 2c are formed in the flange 2. The long holes 2c extend through the flange 2 in an axial direction. The long holes 2c further extend in circumferential directions, as is shown in FIG. 3.

A roughly disk-shaped retaining plate 4 and clutch plate 5 are disposed on opposite outer circumferential sides of the spline hub 1. A plurality of holes 4a and 5a are formed at spaced apart intervals in the retaining plate 4 and clutch plate 5 (a first rotatable portion), respectively. Both plates 4 and 5 are installed on the flange 2 by stop pins 6. The stop pins 6 extend through holes 4a and 5a and further through the long holes 2c of the flange 2. The plates 4 and 5 may undergo limited relative rotation with respect to the flange 2 as a result of the stop pins 6 extending through the long holes 2c. In other words, the limited relative rotation of the plates 4 and 5 with respect to the flange 2 is determined by the circumferential length of the long holes 2c.

Bent parts 4b and 5b are formed on an inner circumferential portion of the plates 4 and 5, respectively, such that the bent parts 4b and 5b confine the O rings 3 between the step 2b and the plates 4 and 5. At an outer circumference of the retaining plate 4, a bent part 4c that extends toward the clutch plate 5 is formed. The bent part 4c is fixed together with a clutch disk to the outer circumference of the clutch plate 5 by rivets 8. Retaining parts 4d are formed at two radially opposite positions on the bent part 4c. The retaining parts 4d are formed by pressing (deforming) so as to project radially inward toward corresponding protrusion 2a of the flange 2, as is shown in FIGS. 1 and 3.

As described above, the retaining plate 4 and clutch plate 5 are disposed on opposite side surfaces of the spline hub 1 and together with the hub 1 define an annular ring like fluid chamber 10 which is sealed by the O rings 3. The fluid chamber 10 is divided into two semicircular arc-like fluid sub-chambers by the protrusion 2a and the retaining part 4d.

A damper oil or viscous fluid having a predetermined viscosity fills the internal spaces of the fluid chamber 10. It is preferable that the damper oil, which fills the fluid chamber 10, be substance that is a semi-solid such as grease. The kinematic viscosity of the base oil of the damper oil is preferably within a range of 500–50,000 cSt at 60° C. When the kinematic viscosity of the base oil of the damper oil is less than 500 cSt at 60° C., the viscous resistance obtained is not large enough. When the kinematic viscosity of the base oil of the damper oil is more than 50,000 cSt at 60° C., the viscous resistance becomes too large to perform the twisting operation in the dampening mechanism.

Figure 4:
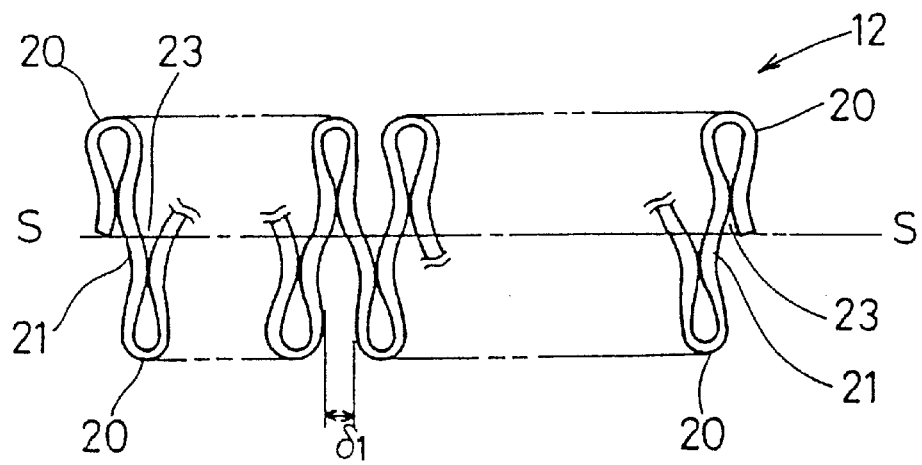
FIG. 4 is an end view of an undulated spring shown removed from the clutch disk depicted in FIGS. 1, 2 and 3.

There are two elongated undulated flat-springs 12 disposed in the fluid chamber 10, one undulated flat-spring 12 in each of the two arc-like sub-chambers of the fluid chamber 10. As shown in FIG. 4, each undulated flat-spring 12 is defined by spring elements, each spring element having a loop section 20 and lever sections 21. A plurality of spring elements extend in series end to end and are compressible. In the embodiment depicted in FIG. 4, the loop sections 21 and the lever sections 21 of the undulated flat-spring 12 are formed by bending an elongated strip-like plate. Loop ends 23 between the loop sections 20 and pairs of the lever sections 21 have curved surfaces. Each undulated flat-spring 12 formed as described is disposed within each arc-like chamber, extends in an arc shape, and can deform elastically in a circular direction.

In the structure described above, a plurality of loop sections 20 are formed on both radially inner and radially outer sides of each undulated flat-spring 12. Each loop section 20 is rounded, has roughly equal diameters, and has a gap with a predetermined length of 61 between an adjacent loop sections 20, as shown in FIG. 4.

Each loop section 20 has loop ends 23 which contact one another, as shown in FIG. 4. From each side of each loop end 23, one lever sections 21 extends outward a radially opposite side of the undulated flat-spring 12.

Each lever section 21 extends out from corresponding loop ends 23 to assist in defining the gap with the predetermined length of $\delta_1$ and connects with one of the loop ends 23 of the respective opposite loop section 20. In other words, connected loop ends 23 of the connected loop sections 20 are curved such that the lever sections 21 are not parallel with the loop sections 20 but are extend away from the loop ends 23 at an angle with respect to the loop sections 20. Opposite ends of the undulated flat-spring 12 contact the protrusion 2a and the retaining portion 4d.

A plurality of fluid filled spaces 11 are defined between the loop sections 20, as shown in FIG. 3. The fluid filled spaces 11 are filled with the damper oil with the predetermined viscosity, described above, and are formed between each portion of the folded flat spring 12 extending toward the inner circumferential side and both the outer circumferential wall and side wall of the fluid chamber 10. In other words, as shown in FIG. 3, each loop section 20 on the outer circumferential side is in contact with the inner circumferential face of the bent part 4c and prevents the damper oil from moving between fluid filled spaces. As shown in FIG. 1, a small choke gap C is formed between the axially end face of the folded flat spring 12 and the side wall or the inner wall of the side face of the fluid chamber 10 (clutch plate 5 and retaining plate 4). The size of the choke gap C is pre-set to be 0.6 mm or less. The length in an axial direction of the choke gap C is preferably 0.1 mm or more. When the length in an axial direction of the choke gap C is more than 0.6 mm, the resulting viscosity resistance decreases. When the length in an axial direction of the choke gap C is less than 0.1 mm, rubbing resistance results between the folded flat spring 12 and the plates 4 and 5 by thermo-expansion of each part at high temperatures. The dampening performance during the combustion fluctuation decreases through the rubbing resistance between these parts. As described above, the dampening mechanism includes the first rotatable portion including the clutch plate 5 and the retaining plate 4, the second rotatable portion including the spline hub 1, the folded flat spring 12 disposed therein, and the viscous fluid which fills the fluid chamber 10 formed by the clutch plate 5 and the retaining plate 4.

The operation is described as follows.

Torque is transmitted to the clutch plate 5 and the retaining plate 4 via the friction facing 7. The torque is then transmitted from the retaining portion 4d of the retaining plate 4 to the folded flat spring 12. The torque transmitted to the folded flat spring 12 is transmitted via the flange part 2 from the spline hub 1 to an output shaft (not shown).

When twisting vibrations are inputted in the clutch disk assembly 1 by engine torque fluctuations, the plates 4 and 5 and the spline hub 1 periodically rotate relative to one another.

When the folded flat spring 12 is compressed, a force is applied to each lever section 21 and the lever section 21 is deformed. In other words, an opening angle of each lever section 21 becomes small, so that the bending moment is applied to the loop section 20. At this time, the lever section 21 flexes while the loop end 23 functions as a fulcrum. Since the loop section 20 is also deformed elastically, elastic energy is then dispersed and stored in a plurality of loop sections 20. In addition, since the width of the folded flat spring 12 is small, elastic energy stored in a specific volume of the folded flat spring 12 is larger than that of a conventional coil spring. When the lever section 21 is deformed, the loop end 23 of the loop section 20 functions as a fulcrum. Therefore, stress around the loop end 23 increases and stress at the top of the loop section 20 decreases remarkably. Thus, the stress of each portion of the spring becomes more uniform.

In addition, since the curved face projecting toward the opposite side is formed between the loop section 20 and the lever section 21, the deformation of the lever section 21 makes a fulcrum move apart from the loop section, leading to a short arm length and high rigidity. Thus, when the twisting angle between the plates 4 and 5 and the spline hub 1 becomes larger, the rigidity increases. Therefore, it is possible to increase torque transmission capacity while absorbing twisting vibrations.

When the folded flat-springs 12 are compressed, the damper oil which fills a plurality of viscous fluid filled spaces 11, passes through a choke gap C formed between the undulated flat-spring 12 and both the retaining plate 4 and the clutch plate 5. Therefore, the flow of the damper oil is restricted, and a predetermined viscosity damping force is generated. Thus, a hysteresis torque corresponding to the section area of the gap is obtained. Since the damper oil has a kinematic viscosity within a range of 500 to 50,000 cSt at 60° C., a large viscous resistance can be obtained within a range of a large torsion angle.

Since the damper oil lubricates each portion within the viscous fluid filled spaces 11, the folded flat-springs 12 can be compressed smoothly and abrasion of each portion can be prevented.

As described above, in the present embodiment, by using the undulated flat-spring 12 while maintaining a low spring rigidity that is equivalent to a conventional coil spring, it is possible to decrease the width of the undulated flat-spring 12 in an axial direction, leading to a decrease of the axial dimension of the clutch disk assembly.

Particularly, this clutch disk assembly displays a spring function and a viscosity resistance function through a simple structure in which the folded flat-springs 12 are disposed in the fluid chamber 10. On the other hand, a conventional clutch disk assembly has a complicated and large structure, because the friction generating mechanisms comprised of coil springs and a plurality of plates are disposed individually.

The undulated flat-spring 12 extends lengthwise in a circular direction. Therefore, since it is possible to make the flex margin or twisting angle of the undulated flat-spring 12 larger, the absorption of torque fluctuations can be accomplished effectively.

ALTERNATE EMBODIMENT

Figure 5:
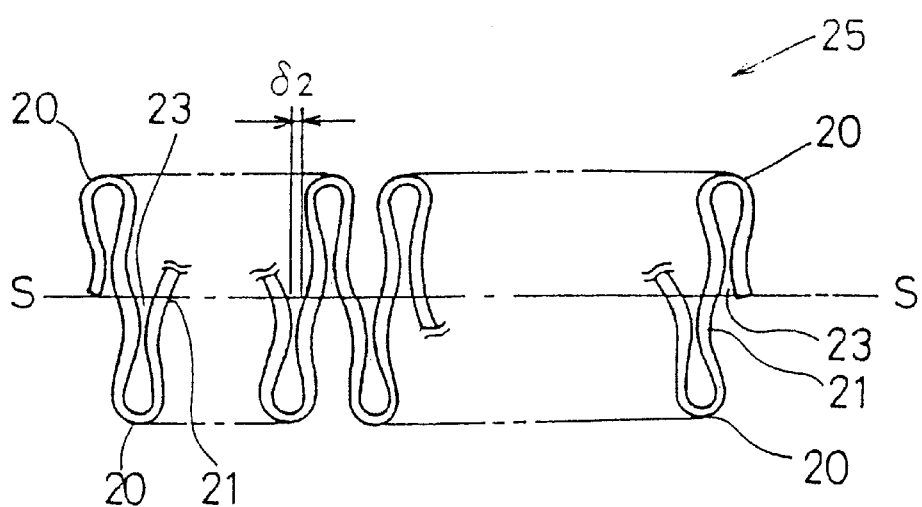
FIG. 5 is an end view similar to FIG. 4 of an alternate embodiment of the undulated spring.

In the foregoing embodiment, each pair of loop ends 23 of each loop section 20 of the undulated flat-springs 12 contacts each other. However, as shown in FIG. 5, a gap 52 may be formed between the loop ends 23 with an undulated flat-spring 25 in a compression free condition. In this case, when the folded flat-spring 25 is compressed, the opening angle of the respective lever sections 21 become smaller, so that the bending moment is applied to the loop section 20. At this time, torsion characteristics of low rigidity are exhibited by the rigidity of the loop section 20, until the gap $\delta_2$ of the loop ends 23 is eliminated. When the compression continues, the lever sections 21 flex about the loop ends 23 as a fulcrum, so that torsion characteristics of relatively high rigidity are exhibited. Thus, it is possible to obtain two stage torsion characteristics.

It is preferable that the damper oil, which fills the fluid chamber 10, be a semi-solid like a grease. The kinematic viscosity of the damper oil base oil is preferably within the range of 500–50,000 cSt at 60° C. In this case, a large viscous resistance is obtained especially when the torsion angle is large. When the kinematic viscosity of the damper oil base oil is less than 500 cSt at 60° C., the viscous resistance obtained is not large enough. When the kinematic viscosity of the base oil of the damper oil is more than 50,000 cSt at 60° C., the viscous resistance becomes too large to perform the twisting operation in the dampening mechanism.

The size of the choke gap C between the axial end face of the undulated flat-spring 12 and the inner wall of the side face of the fluid chamber 10 is preferably within a range of 0.1 mm to 0.6 mm. In this case, particularly a large viscous resistance can be obtained within a range of a large torsion angle. When the length in an axial direction of the choke gap C is less than 0.1 mm, the rubbing resistance is caused between the undulated flat-spring 12 and the plates 4 and 5 by thermo-expansion of each part at high temperatures. The dampening performance during combustion fluctuations decreases through the rubbing resistance between these parts. When the length in an axial direction of the choke gap C is more than 0.6 mm, it is difficult to maintain a large viscous resistance.

The structure of the dampening mechanism according to the present invention can be applied to other devices to transmit a motive power, and is not limited to a clutch disk assembly.

EFFECTS OF THE INVENTION

In the dampening mechanism according to the present invention, when the relative rotational angle between the first rotatable portion and the second rotatable portion becomes large, a plurality of fluid filled spaces are compressed, so that the fluid flows out. At this time, a large viscous resistance is generated because the gap between the folded flat-spring and the inner wall of the side faces of the fluid chamber is 0.6 mm or less. Consequently, the damper mechanism can attenuate excessive torque fluctuations sufficiently.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What is claimed is:

1. A dampening disk assembly comprising:
   a pair of plates each having an inner axially facing surface and joined together at a radial outer portion thereof;
   a hub disposed at a generally central portion of said pair of plates, said hub and said axially facing surfaces of said plates defining a generally annular fluid chamber therebetween, said annular fluid chamber being a closed and sealed space that is filled with a viscous fluid, said hub having a contact portion extending partially into said annular fluid chamber;
   an undulated flat-spring disposed in said annular fluid chamber, said undulated flat-spring being compressible between said contact portion of said hub and a contact portion of one of said pair of plates in response to relative rotary displacement between said hub and said pair of plates, said undulated flat-spring having axial edges facing said axial surfaces of said pair of plates; and a axial gap being defined between each of said axially facing surfaces of said pair of plates and each of said axial edges of said undulated flat-spring, said axial gaps defining a choke for limiting movement of said viscous fluid within said annular chamber in response to compression of said undulated flat-spring, said axial gaps being within a range of 0.1 to 0.6 mm at all portions thereof.

2. The dampening mechanism as set forth in claim 1 wherein said viscous fluid disposed in said annular fluid chamber has a kinematic viscosity within a range of 500–50,000 cSt at 60° C.

3. The dampening disk assembly as set forth in claim 1, wherein said undulated flat-spring is defined by a plurality of spring elements located between said contact portion of said hub and said contact portion of said one of said pair of plates, each of said spring elements having loop sections, loop ends and lever sections, said loop sections being formed on radially inner and outer sides of said undulated flat-spring, said loop end being in between said loop sections, said lever sections extending from said loop end in radially opposite directions to connect to said loop sections, said loop ends being arranged to contact one another, said loop sections being circumferentially unrestrained between said contact portions of said hub and said one of said pair of plates.

4. The dampening disk assembly as set forth in claim 1, wherein said undulated flat-spring is defined by a plurality of spring elements located between said portion of said hub and said portion of said one of said pair of plates, each of said spring elements having a loop section, loop ends and lever sections, said loop sections being formed on radially inner and outer sides of said undulated flat-spring, said loop end being in between said loop sections, said lever sections extending from said loop end in radially opposite directions to connect to said loop sections, said loop sections being circumferentially unrestrained between said contact portions of said hub and said one of said pair of plates; and said loop ends are spaced apart with a circumferential gap therebetween when said undulated flat-spring is in a non-compressed condition, and said circumferential gap is eliminated when said undulated flat-spring is compressed.

5. The dampening disk assembly as set forth in claim 1, wherein said undulated flat-spring has a plurality of loop sections disposed between said contact portions of said hub and said one of said pair of plates, said loop sections being unrestrained between said contact portions of said hub and said one of said pair of plates.

* * * * *